United States Patent [19]
Miller et al.

[11] Patent Number: 5,720,603
[45] Date of Patent: Feb. 24, 1998

[54] VANE PUMP

[75] Inventors: Claus Peter Miller, Senden; Georg Staudenrausch, Biberach an der Riss, both of Germany

[73] Assignee: Albert Handtmann Maschinenfabrik GmbH & Co. KG, Biberach, Germany

[21] Appl. No.: 572,182

[22] Filed: Dec. 13, 1995

[30] Foreign Application Priority Data

Dec. 19, 1994 [DE] Germany .............................. 9420306 U

[51] Int. Cl.[6] .............................. F01C 21/00; F04B 49/00
[52] U.S. Cl. .............................. 418/180; 418/261; 417/310; 452/41
[58] Field of Search .............................. 418/150, 180, 418/261; 417/310; 452/41

[56] References Cited

U.S. PATENT DOCUMENTS

| | | | |
|---|---|---|---|
| 3,473,478 | 10/1969 | Little et al. | 417/310 |
| 4,761,121 | 8/1988 | Battista et al. | 418/180 |
| 4,971,528 | 11/1990 | Hodgkins et al. | 417/310 |
| 5,069,608 | 12/1991 | Rather | 418/261 |
| 5,127,382 | 7/1992 | Sowards | 417/310 |
| 5,380,240 | 1/1995 | Staudenrausch | 452/41 |

FOREIGN PATENT DOCUMENTS 42 27 621  2/1994  Germany .

*Primary Examiner*—Charles G. Freay
*Attorney, Agent, or Firm*—Tilton, Fallon, Lungmus & Chestnut

[57] ABSTRACT

The present invention refers to a vane pump used for dividing a pasty and compressible substance into portions and comprising a pump housing and a rotor which is arranged eccentrically in said pump housing and which is adapted to be rotated, and further comprising vanes which are supported within said rotor such that they are radially displaceable, said vanes defining with the wall of the pump housing, the base and the cover of said housing, as well as the outer surface of the rotor, vane cells and cooperating sealingly with said components, and said pump housing having an inlet and an outlet which have arranged between them a compression sector and a dosing sector, and a pressure-relief valve being arranged at least in the area of the dosing sector. In order to improve the vane pump still further, the present invention provides the feature that a back-flow passage is arranged in such a way that, when the pressure-relief valve responds, said valve will connect the interior of the pump housing via the back-flow passage to the inlet.

5 Claims, 3 Drawing Sheets

VANE PUMP

The present invention refers to a vane pump used for dividing into portions a pasty and compressible substance, in particular sausage meat, and comprising a pump housing and a rotor which is arranged eccentrically in said pump housing and which is adapted to be rotated, and further comprising vanes which are supported within said rotor such that they are radially displaceable, said vanes defining with the wall of the pump housing, the base and the cover of said housing, as well as the outer surface of the rotor, vane cells and cooperating sealingly with said components, and said pump housing having a sausage meat inlet and a sausage meat outlet which have arranged between them a compression sector and a dosing sector, and a pressure-relief valve being arranged at least in the area of the dosing sector.

In order to achieve high positioning accuracy with such vane pumps, DE 42 27 621 already suggests a device in which each vane cell filled with sausage meat passes through a dosing sector after having passed through a compression sector, said dosing sector being arranged between the compression sector and the discharge sector and a compensating cylinder/piston unit being arranged in the boundary region of the compression sector. The sausage meat coming from the inlet reaches a vane cell and is guided by the rotating vanes into the compression sector in the direction of rotation, and in the course of this process, it is compressed due to the fact that the vane cell volume decreases in the compression sector. In the dosing sector, the sausage meat is often compressed excessively so that pressure compensation is required. If the vane is in the area of the cylinder/piston unit, the excess pressure in the vane cell will force the piston upwards, against the force exerted by the spring, so that, via the vane and by means of the compensating cylinder, highly compressed sausage meat from the leading vane cell will be pressed back into the trailing vane cell in which a lower pressure prevails, since said trailing vane cell is still connected to the inlet.

The amount of compressed sausage meat which is to be pressed from the leading vane cell into the trailing vane cell for the purpose of pressure compensation depends on the volume which is defined by the piston moving upwards in the cylinder as well as on the rotational speed of the vanes. For this reason, the compensating cylinder is provided with comparatively large dimensions.

Hence, it is the object of the present invention to improve the known vane pump still further.

In accordance with the present invention, this object is achieved by the feature that a back-flow passage is arranged in such a way that, when the pressure-relief valve responds, said valve will connect the interior of the pump housing via the back-flow passage to the inlet.

The vane pump according to the present invention provides the advantage that the pressure in the dosing sector can be controlled continuously and independently of the dimensions of the pressure-relief valve. The solution according to the present invention can be realized simply and at a reasonable price.

According to a preferred embodiment, a compensating cylinder is provided as a pressure-relief valve, said compensating cylinder having supported therein a compensating piston which is acted upon by a spring. The pressure in the dosing area can be adjusted in a simple manner through the spring constant of the spring used.

It will additionally be advantageous when the compensating cylinder is arranged in the base or in the cover of the pump housing and when it is open towards the interior of said pump housing, the piston crown closing a connection opening between the compensating cylinder and the back-flow passage, when it is at a closed position, and being urged upwards in response to high pressure in the dosing sector against the force exerted by the spring so that the connection opening will be opened at least partially.

In this arrangement, the pressure-relif valve is arranged in a space-saving manner.

According to a preferred embodiment of the vane pump, the angle $\alpha$ of the compression sector approximately corresponds to the sector angle $\beta$ of a vane cell, the compensating cylinder being arranged axially and extending in the compression sector as well as in the dosing sector.

It will be advantageous to provide the back-flow passage in the form of a hole in the cover between the pressure relief valve and the inlet. The vane pump, which is already known from the prior art, can thus be improved by means of a simple hole, without any expensive structural components being required.

The present invention will be explained in detail on the basis of the drawings following hereinbelow, in which.

Figure 2:
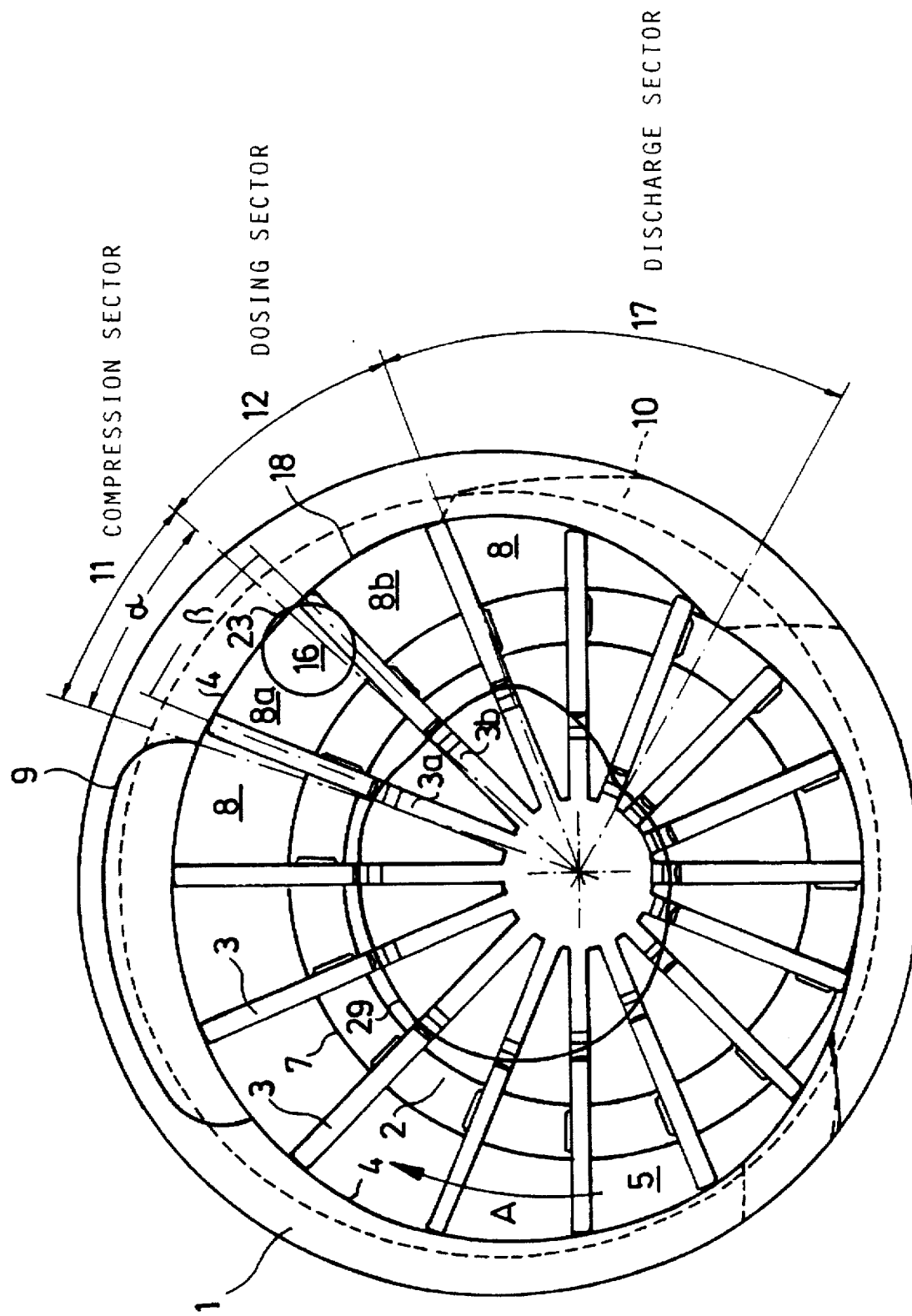
FIG. 2 shows a cross-sectional top view of a vane pump without cover.
Figure 3:
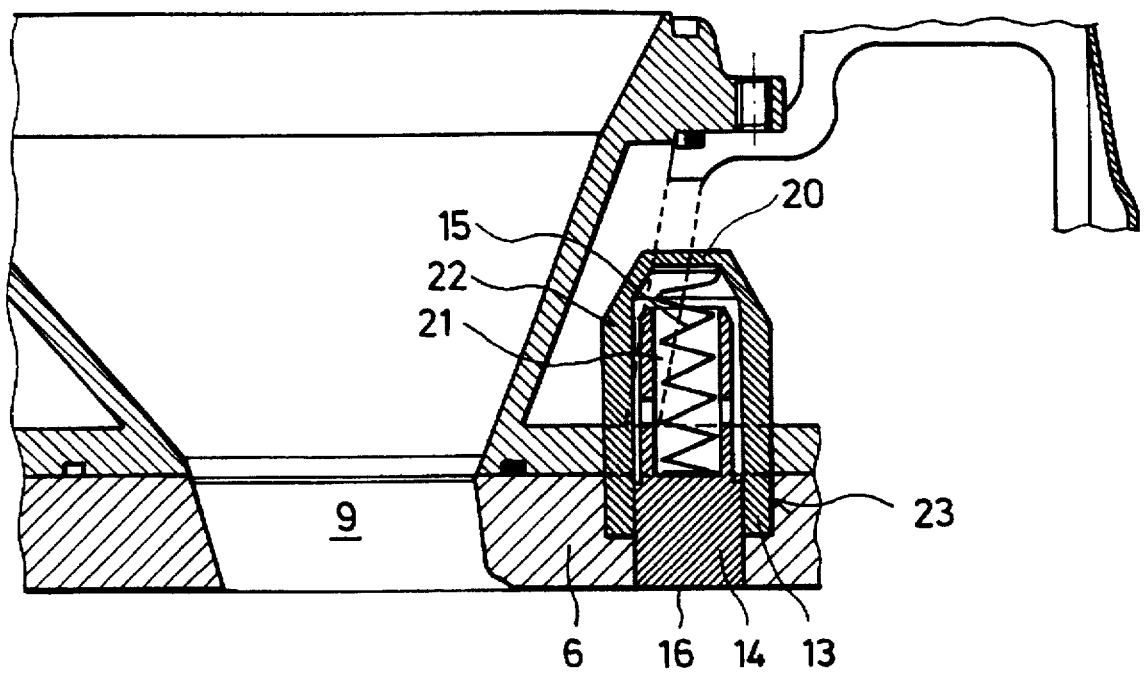
FIG. 3 shows an axial partial section of a vane pump according to the prior art.

As can especially be seen from FIG. 2, the vane pump comprises a pump housing 1 and a rotor 2 eccentrically arranged in said pump housing 1 and adapted to be rotated, and, in said rotor 2, vanes 3 which are supported such that they are radially displaceable, said vanes 3 defining with the wall of the pump housing 1, the base and the cover 6 of said housing 1, as well as the outer surface 7 of the rotor 2, vane cells 8 and cooperating sealingly with said components, and said pump housing 1 having a sausage meat inlet 9 and a sausage meat outlet 10 which have arranged between them a compression sector 11 and a dosing sector 12.

The compression sector 11 extends over an angular region $\alpha$ having approximately the same size as the angular region $\beta$ of the sector of a vane cell 8, said angular region $\beta$ being defined by the centre lines of two neighbouring vanes 3.

Figure 1:
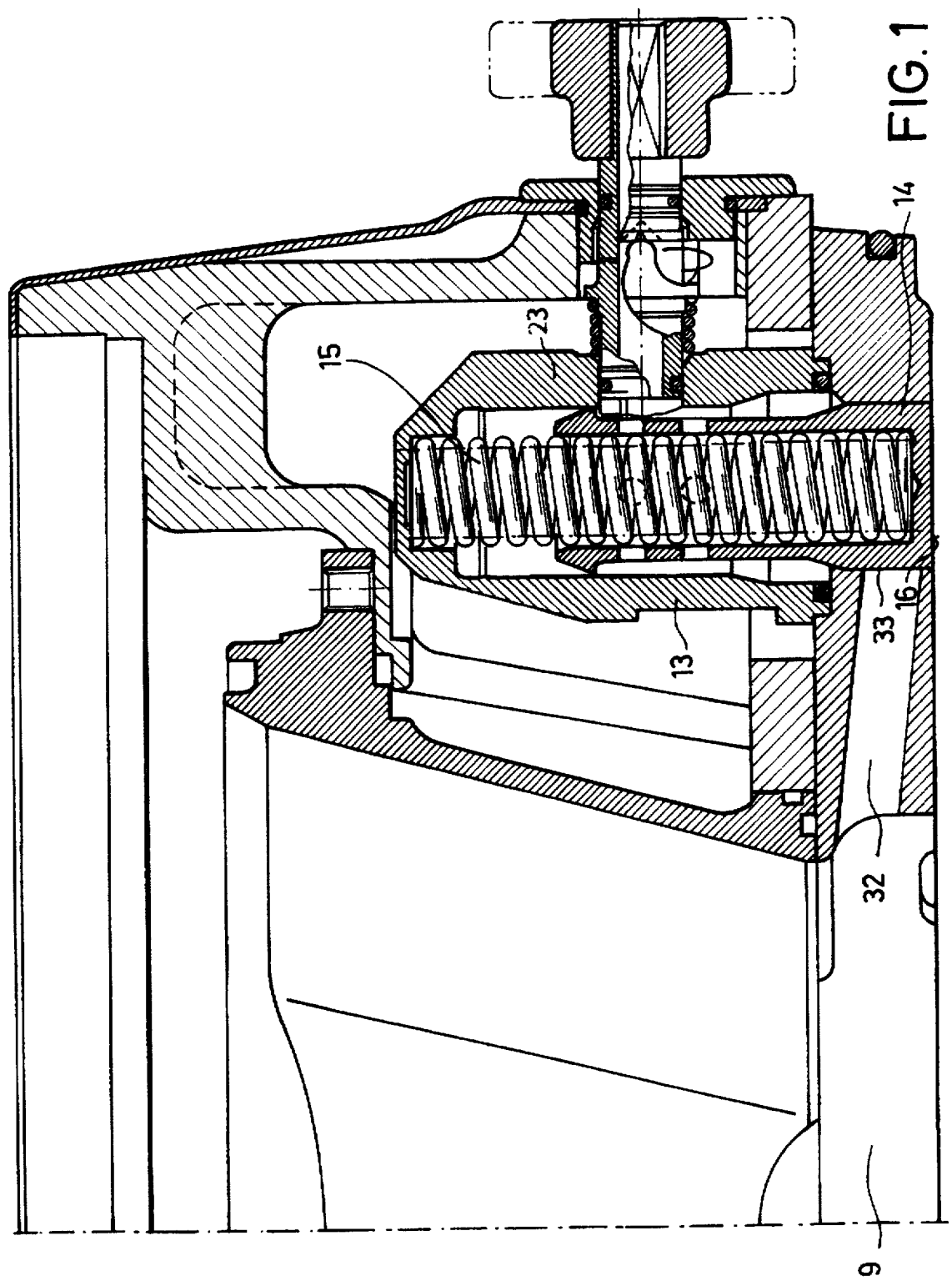
FIG. 1 shows an axial partial section of an embodiment of a vane pump according to the present invention.

In the area of the inner wall 4 of the pump housing 1 and—when seen in the direction of rotation of the rotor 2—in the end portion of the compression sector 11, an axially oriented compensating cylinder 13 is arranged in the cover 6 of the pump housing 1, said compensating cylinder 13 being also shown in FIG. 1. The compensating cylinder 13 is open towards the interior of the pump housing 1. A compensating piston 14 is slidably supported in said compensating cylinder 13. The rear end of said compensating piston 14 is provided with an axially oriented hole in which a compression spring 15 is supported, said compression spring 15 resting on the base 20 of the compensating cylinder 13 and being biased so that it urges the compensating piston 14 forwards, i.e. in the direction of the interior of the pump housing 1.

At a closed position of the pressure-relief valve, i.e. of the compensating piston 14, the piston crown 16 of the compensating piston 14 is flush with the inner wall of the cover 6 of the pump housing 1 so that the piston crown defines a smooth surface with said inner wall of the cover 6 and so that the vanes 3 can freely glide along said smooth surface.

The compensating cylinder 13 is forced into a blind hole 23 of the cover 6 and fixed in position.

When the cover 6 of the pump housing 1 has been opened, the compensating piston 14 can be removed from the compensating cylinder 13.

This is done for replacing e.g. the spring 15 by a stronger or a weaker compression spring.

The diameter of the compensating cylinder 13 and that of the compensating piston 14, respectively, is chosen such that, with regard to the position described hereinbefore, said compensating cylinder 13 and said compensating piston 14 extend in the compression sector 11 as well as in the dosing sector 12.

As can be seen from FIG. 2, the inner wall of the pump housing 1 has a contour 18, which deviates from a circular arc and which determines the compression sector 11 and the discharge sector 17. In the area of the dosing sector 12, the shape of the contour corresponds to that of a circular arc having its centre at the centre of the rotor.

The rotor 2 rotates together with the vanes 3 in the direction of the arrow A.

As can be seen in FIG. 1, the compensating cylinder 13 and the inlet 9 have provided between them a hole 32 as a back-flow passage at an angle of e.g. 11° relative to the horizontal, said hole 32 being formed in the cover. The back-flow passage communicates with the compensating cylinder 13 via the connection opening 33. If the pressure-relief valve, i.e. the compensating cylinder/piston unit, responds due to excessive pressure in the interior of the pump housing, the piston 14 will rise and a connection between the inlet 9 and the interior of the pump housing 1 will gradually be established in the area of the compression sector/dosing sector via the connection opening 33. It follows that, if the pressure in the interior of the vane cell is excessively high, sausage meat can continuously be forced back into the inlet 9 via the back-flow passage 32. In the course of this process, the piston 14 need not rise completely so that only part of the connection opening 33 will be exposed. The degree of opening of the connection opening is pressure-dependent.

The mode of operation of the present invention will be explained in detail hereinbelow.

The sausage meat is introduced through the inlet 9 into the vane pump. Each of the vane cells 8 passes, in the direction of arrow A, through the compression sector 11, the dosing sector 12 and the discharge sector 17, in succession.

While each filled vane cell 8 is passing through the compression sector, the sausage meat contained in the respective vane cell is compressed due to the shape of the contour 18 in such a way that, depending on its compressibility, the sausage meat is compacted in accordance with the reduction of volume.

The vane cell containing the compacted sausage meat subsequently reaches the dosing sector 12. Although the shape of the contour in said dosing sector 12 corresponds to that of a circular arc, the sausage meat will still be compacted to a slightly higher degree as long as the trailing vane 3a of the vane cell 8a still passes through the compression sector 11.

As has already been explained, the pressure in a vane cell 8b will rise, if said vane cell is positioned e.g. between the compression sector and the dosing sector. When the pressure in this area has reached a certain value, the spring 15 is urged upwards so that the piston 14 will move upwards. By selecting the respective spring constant, it is possible to determine the pressure in the interior of the pump housing 1 in response to which the piston should rise in such a way that the connection opening 33 to the back-flow passage 32 will be opened at least partially. If a connection exists between the inlet 9 and the vane cell 8, highly compressed sausage meat can be forced back into the inlet 9 via the back-flow passage so that a desired pressure can be established in the respective vane cell. The pressure in the dosing sector can thus be controlled continuously in a simple and reliable manner. As a matter of fact, it is not absolutely necessary to provide the pressure-relief valve precisely between the compression sector and the dosing sector in the manner described hereinbefore, but, if this is the case, it will additionally be possible—if e.g. the vane cell 8b and the vane cell 8a are both located in the area of the piston crown and if the vane cell area 8a is additionally connected to the inlet 9—to force compressed sausage meat from the cell 8b in the dosing sector via the vane 3b into the vane cell 8a in which a lower pressure prevails, this being, for example, also disclosed in detail in FIG. 2 to 7 of the Offenlegungsschrift DE 42 27 621 cited hereinbefore.

In order to sum up, it can be stated that the concept according to the present invention provides sufficient pressure compensation independently of the dimensions of the compensating cylinder.

We claim:

1. A vane pump used for dividing into portions a pasty and compressible substance, comprising a pump housing (1) with a wall (4), a base (5), and a cover (6), said vane pump further comprising, a rotor (2) which is arranged eccentrically in said pump housing and which is adapted be to rotated, and vanes (3) which are supported within said rotor (2) such that they are radially displaceable, said vanes (3), said wall (4) of the pump housing (1), said base (5) a cover (6) of said housing (1), and an outer surface (7) of the rotor (2) defining vane cells (8) and said vanes (3) in sealing engagement with said wall (4), said base (5), said cover (6), and said outer surface (7) of said rotor (2), said pump housing (1) further having a substance inlet (9) and a substance outlet (10) which have arranged between them a compression sector (11) and a dosing sector (12), and a pressure-relief valve (13, 14) being arranged at least in the area of the dosing sector, and including a back-flow passage (32) arranged in such a way that, when the pressure-relief valve (13, 14) responds, said valve (13, 14) will connect the interior of the pump housing (1) via the back-flow passage (32) to the inlet (9).

2. A vane pump according to claim 1, wherein a compensating cylinder (13) is provided as said pressure-relief valve (13, 14), said compensating cylinder (13) having supported therein a compensating piston (14) which is acted upon by a spring.

3. A vane pump according to claim 2, wherein said compensating cylinder is arranged in said base (5) or in said cover (6) of said pump housing and is open towards the interior of said pump housing (1), and a piston crown (16) closing a connection opening (33) between said compensating cylinder and said back-flow passage when it is at a closed position, and being urged upwards in response to high pressure in said dosing sector (12) against the force exerted by said spring so that said connection opening (33) will be opened at least partially.

4. A vane pump according to claim 3, wherein every two of said vanes (3) define a sector angle $\beta$ of a vane cell (8), said compression sector (11) being defined by a rotational sector of the rotation of said rotor (2) said rotational sector defining an angle $\alpha$, said compression sector (11) is the part between said substance inlet (9) and said substance outlet (10) in which said wall (4) of the pump housing (1) is non-circular, said angle $\alpha$ of said compression sector (11) approximately corresponding to the sector angle $\beta$ of said vane cell (8), and that said compensating cylinder (13) is arranged axially and extends in said compression sector (11) as well as in said dosing sector (12).

5. A vane pump according to claim 1, wherein said back-flow passage is a hole provided in said cover (6) between said pressure relief valve (13, 14) and said inlet (9).

UNITED STATES PATENT AND TRADEMARK OFFICE
CERTIFICATE OF CORRECTION

PATENT NO. : 5,720,603
DATED : February 24, 1998
INVENTOR(S) : Claus Peter Miller et al It is certified that error appears in the above-indentified patent and that said Letters Patent is hereby corrected as shown below:

Claim 1, column 4, line 33 "be to" should be --to be--.

Signed and Sealed this

Fourteenth Day of July, 1998

Attest:

BRUCE LEHMAN

Attesting Officer

Commissioner of Patents and Trademarks